US009378116B2

(12) United States Patent
Brunkhorst et al.

(10) Patent No.: US 9,378,116 B2
(45) Date of Patent: Jun. 28, 2016

(54) PROGRAM SUBSET EXECUTION AND DEBUG

(75) Inventors: Richard A. Brunkhorst, Raleigh, NC (US); Joel Duquene, Raleigh, NC (US); David S. Myers, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1077 days.

(21) Appl. No.: 13/102,016

(22) Filed: May 5, 2011

(65) Prior Publication Data
US 2012/0284698 A1    Nov. 8, 2012

(51) Int. Cl.
*G06F 9/44* (2006.01)
*G06F 11/36* (2006.01)

(52) U.S. Cl.
CPC .......... *G06F 11/3636* (2013.01); *G06F 11/362* (2013.01); *G06F 11/366* (2013.01)

(58) Field of Classification Search
None
See application file for complete search history.

(56) References Cited

U.S. PATENT DOCUMENTS

| 6,745,344 B1 | 6/2004 | Joshi et al. | |
| 6,901,581 B1 | 5/2005 | Schneider | |
| 6,981,243 B1 | 12/2005 | Browning et al. | |
| 7,076,692 B2 | 7/2006 | Grey | |
| 7,634,690 B2 * | 12/2009 | Barsness et al. | 714/38.14 |
| 2003/0217355 A1 * | 11/2003 | Hack et al. | 717/129 |
| 2008/0168428 A1 * | 7/2008 | Bates et al. | 717/129 |
| 2008/0301651 A1 | 12/2008 | Seneski et al. | |
| 2010/0180263 A1 * | 7/2010 | Lee et al. | 717/135 |

OTHER PUBLICATIONS

Arnold et al., Stack Trace Analysis for Large Scale Debugging, in Parallel and Distributed Processing Symposium, IEEE International, Mar. 25-30, 2007, pp. 1-10.*
Balzer, EXDAMS-EXtendable Debugging and Monitoring System, in Proceeding of the Spring Joing Computer Conference, May 14-16, 1969, pp. 567-580.*
Robert H. B. Netzer, et al., Adaptive Message Logging for Incremental Replay of Message-Passing Programs, Article, Parallel & Distributed Technology: Systems & Applications, Nov. 1993, pp. 1-10, ISSN: 1063-6552, IEEE, Published on the World Wide Web.
United States Patent and Trademark Office, Office Action for U.S. Appl. No. 14/222,001, Aug. 15, 2014, pp. 1-24, Alexandria, VA, USA.
United States Patent and Trademark Office, Office Action for U.S. Appl. No. 14/222,001, Dec. 31, 2014, pp. 1-24, Alexandria, VA, USA.

(Continued)

*Primary Examiner* — Wei Zhen
*Assistant Examiner* — Timothy Duncan
(74) *Attorney, Agent, or Firm* — Lee Law, PLLC; Christopher B. Lee

(57) ABSTRACT

In response to identification of an error in operation of a system, a debugging module determines where to set a debug entry point for a program subset debug session. An initial file state is captured for at least one file accessed by the system in response to initiation of a subsequent execution of the system. Prior to detection of execution of the system at the debug entry point, any file inputs and file outputs (I/Os) detected during the subsequent execution of the system are queued. Debug entry point metadata, including the captured initial at least one file state, the queued file I/Os, and an image of all instantiated objects at the debug entry point, is stored in response to detection of execution of the system at the debug entry point.

16 Claims, 6 Drawing Sheets

(56) References Cited

OTHER PUBLICATIONS

United States Patent and Trademark Office, Office Action for U.S. Appl. No. 14/222,001, Apr. 23, 2015, pp. 1-23, Alexandria, VA, USA.

United States Patent and Trademark Office, Notice of Allowance for U.S. Appl. No. 14/222,001, Mar. 16, 2016, pp. 1-16, Alexandria, VA, USA.

* cited by examiner

PROGRAM SUBSET EXECUTION AND DEBUG

BACKGROUND

The present invention relates to debugging application programs. More particularly, the present invention relates to program subset execution and debug.

Programmers write code in a programming language using language syntax specified for the respective programming language. The programmers compile and/or build the written code into a form sometimes referred as a program. The program may be in the form of precompiled code (p-code) that is interpretively compiled and/or executed by an interpreter at run time for execution on a target platform. Alternatively, the program may be fully compiled into native machine code that executes directly on the target platform. When the program is executed, it may receive one or more inputs and may generate one or more outputs.

BRIEF SUMMARY

A method includes determining, via a debugging module in response to identification of an error in operation of a system, where to set a debug entry point for a program subset debug session; capturing an initial file state for at least one file accessed by the system in response to initiation of a subsequent execution of the system; queuing, prior to detection of execution of the system at the debug entry point, any file inputs and file outputs (I/Os) detected during the subsequent execution of the system; and storing, in response to detection of execution of the system at the debug entry point, debug entry point metadata including the captured initial at least one file state, the queued file I/Os, and an image of all instantiated objects at the debug entry point.

A system includes a memory and a processor programmed to: determine, in response to identification of an error in operation of a system, where to set a debug entry point for a program subset debug session; capture an initial file state for at least one file accessed by the system in response to initiation of a subsequent execution of the system; queue, prior to detection of execution of the system at the debug entry point, any file inputs and file outputs (I/Os) detected during the subsequent execution of the system; and store in the memory, in response to detection of execution of the system at the debug entry point, debug entry point metadata including the captured initial at least one file state, the queued file I/Os, and an image of all instantiated objects at the debug entry point.

A computer program product includes a computer readable storage medium including computer readable program code, where the computer readable program code when executed on a computer causes the computer to: determine, via a debugging module executing on the computer in response to identification of an error in operation of a system, where to set a debug entry point for a program subset debug session; capture an initial file state for at least one file accessed by the system in response to initiation of a subsequent execution of the system; queue, prior to detection of execution of the system at the debug entry point, any file inputs and file outputs (I/Os) detected during the subsequent execution of the system; and store, in response to detection of execution of the system at the debug entry point, debug entry point metadata including the captured initial at least one file state, the queued file I/Os, and an image of all instantiated objects at the debug entry point.

DETAILED DESCRIPTION

Figure 1:
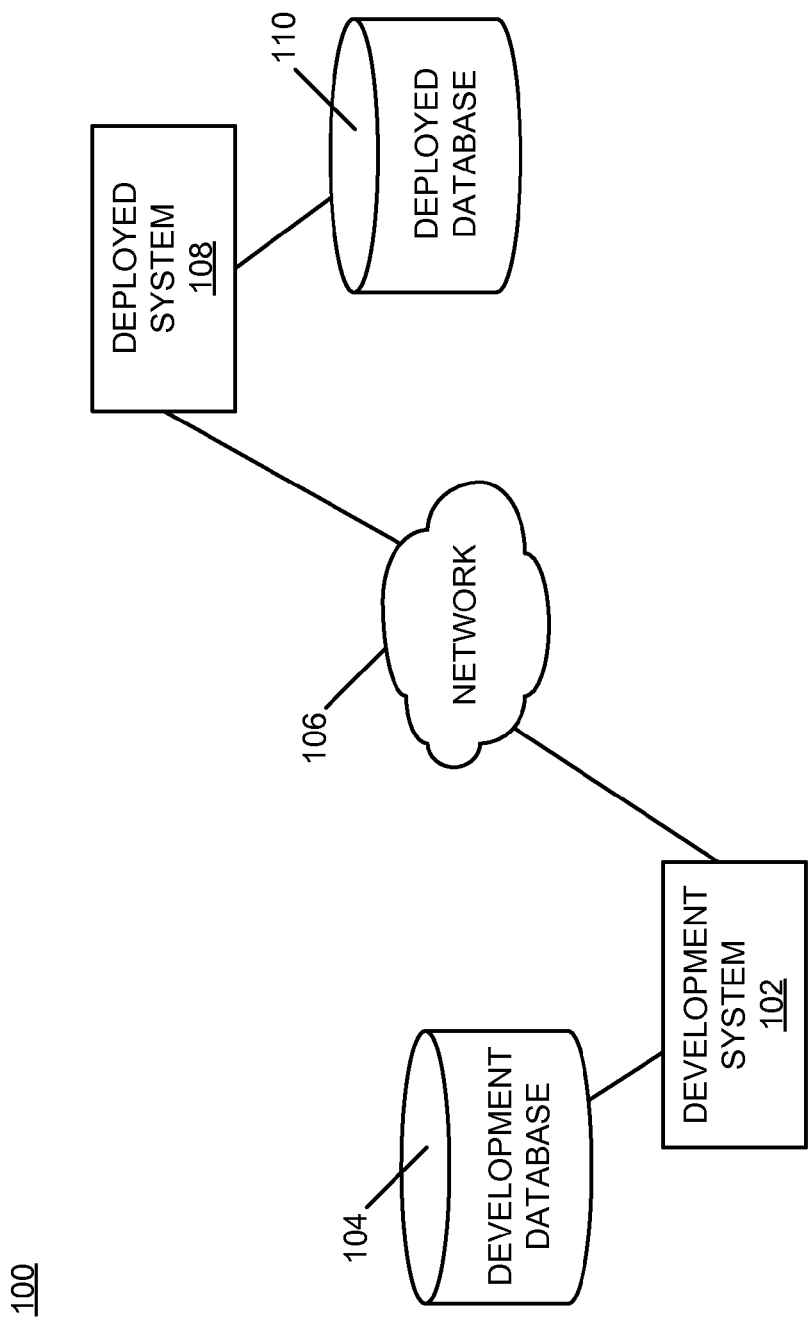
FIG. 1 is a block diagram of an example of an implementation of a system for automated program subset execution and debug according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated program subset execution and debug. The automated program subset execution and debug described herein provides for rapid debugging of errors in complex systems, including complex remote systems that operate for extended periods of time prior to errors. Program subsets may be executed during debugging instead of entire applications to improve debug efficiency. Error(s) in system operation may be automatically detected. In response to identification of an error, the application/code is analyzed by a debugging system to automatically determine the programmatic location of the error and a program subset debug entry point for debugging. A debug marker is set and in response to a system restart, the debugging system stores initial file states (e.g., database files or other files) and begins queuing inputs and output (I/Os) onto a separate debug queue for each I/O channel or thread. In response to detection of execution up to (e.g., at) the debug entry point, an application program snapshot that includes all or a subset of instantiated objects and memory allocations is stored along with the queued I/Os and all of the initial file states. To facilitate debugging of the error, the debugging system recreates files using the captured initial file states, executes all captured I/Os against those files, and instantiates the application program snapshot to place the debugging system and I/Os in the equivalent state of the system with the detected error at the debug point of entry. Debugging may commence, repeatedly if needed, from the debug point of entry without execution of the preceding application code.

It should be noted that conception of the present subject matter resulted from recognition of certain limitations associated with debugging complex systems at remote client sites. For example, it was observed that it is challenging for clients to enter breakpoints into systems for debug information capture when developers of that system are situated remotely from system operating sites. As such, the present subject matter improves debug of complex systems by providing for automated determination of a debug entry point and queuing of all file I/Os prior to the debug entry point. The present subject matter allows duplication of a client execution environment at a development site without requiring developers to travel to client sites and without the associated debugging delays. Debugging may focus on the program subset of interest rather than executing code prior to the automatically determined debug entry point. Accordingly, improved debugging of complex systems may be obtained through use of the automated program subset execution and debug described herein.

Files used by the program may be identified within an application profile for automated use by the debugging system. The application profile may also include code, application, package, procedure or method boundaries, build, or other information usable for identification of a debug entry point for a code subset. The debugging system may automatically identify the respective code subset debug entry point for the code subset of interest by analysis of the application profile. Alternatively, the debugging system may identify the respective code subset debug entry point for the code subset of interest by system or thread stack analysis. As another alternative, execution traces may be used across thread stacks to implement a reverse execution trace for identification of a debug entry point for the code subset of interest.

The initial file states, the queued I/Os, and the application program snapshot are provided to the system development team, which may be remotely located from the operating site, as a set of debug metadata. Additionally, a system snapshot that includes one or more application program snapshots of other threads may be captured, and I/Os for these threads may also be queued. All captured and queued information is time correlated and persisted along with the respective application snapshot(s) within the debug metadata.

The queued I/Os for each channel may be stored within the debug metadata as threads for execution at the start of a debug session. The debug metadata may be exported to a remote developer site or used for debugging locally. In response to starting a debug session, the debugging system (either local or remote) uses the persisted debug metadata to rebuild the system state by instantiating all files and objects from the application and/or system snapshot(s), and executing all queued I/Os against the respective database(s) and/or file(s) up to the debug entry point of code subset of interest. The debugging system then starts execution from the debug entry point instead of executing all prior instructions in the program. If the error occurs during the debug session, information about the error is also captured along with additional debug metadata at the point of error. The debugging session may be iteratively restarted from the debug entry point using the debug metadata to reconstruct all system/application states to rapidly cycle repeated executions to improve debug time.

The debugging system may automatically restart the system in response to detection of an error and setting of the debug marker, or the system restart may be delayed as appropriate for a given implementation. The system restart after the debug marker is set may alternatively be invoked by a system operator or administrator in response to notification of the error by the system via a user interface, messaging, or other output of the debugging system. Alternatively, the system may be restarted at any other point in time as appropriate for a given implementation. Such a determination to automatically restart may be made based upon the severity of the error and may additionally and/or alternatively be made based upon configuration information within a debug profile. The debug profile may be combined with the application profile.

The error(s) in system operation may alternatively be manually identified by an administrator or system operator, and the debugging system may automatically determine the program subset debug entry point for debugging in response to such a notification. As such, whether the error(s) are automatically detected or manually identified, the debugging system performs analysis of the application(s) to determine an appropriate entry point for debugging.

The program subset identified for a point of entry for debugging may be different from the code subset executing at the time of the error. For example, an error may result from a read operation in one module of data written by another module where a hardware storage component may have failed. The present subject matter operates to identify one or more potential code subsets that may be associated with root causes of an error and creates a debug point of entry for a program subset prior to one or more of these identified potential root causes of the error.

The program subset execution and debug described herein may be performed in real time to allow prompt debugging of complex systems rather than requiring extended executions during debugging. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated program subset execution and debug. A development system 102 interfaces with a development database 104. The development system 102 may utilize the development database 104 for initial development of applications that utilize a database and for debug operations associated with deployed applications. The development system 102 communicates via a network 106 with a deployed system 108. The deployed system 108 interfaces with a deployed database 110. The deployed system 108 and the deployed database 110 may, for example, represent a deployed customer system upon which one or more customer applications have been deployed. It should be understood that the development system 102 and the deployed system 108 may include one or more server devices, client devices, or other devices as appropriate for a given implementation. Further, the development database 104 and the deployed database 110 may include one or more database or other storage devices as appropriate for a given implementation. As such, the elements of FIG. 1 generally represent development components and deployed components and many variations are possible and all such variations are considered within the scope of the present subject matter.

As will be described in more detail below in association with FIG. 2 through FIG. 6, the development system 102 and the deployed system 108 provide automated program subset execution and debug. The automated program subset execution and debug is based upon automatic identification of program subsets for debugging within a deployed system without requiring a customer or administrator to manually set break points or capture debug data or metadata. Additionally, information within a deployed system is automatically captured for debugging, either with the deployed system or within a development system, and debugging may be performed without needing to execute all programmatic steps up to the automatically identified debug entry point. As such, debugging of deployed applications may be expedited.

It should be noted that computing devices associated with the development system 102 and the deployed system 108 may be stationary or portable computing devices. For portable device implementations, devices may be considered portable either by a user's ability to move the respective computing devices to different locations, or by the computing device's association with a portable platform, such as a plane, train, automobile, or other moving vehicle. It should also be noted that the computing devices may be any computing device capable of processing information as described above and in more detail below. For example, computing device associated with the development system 102 and the deployed system 108 may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
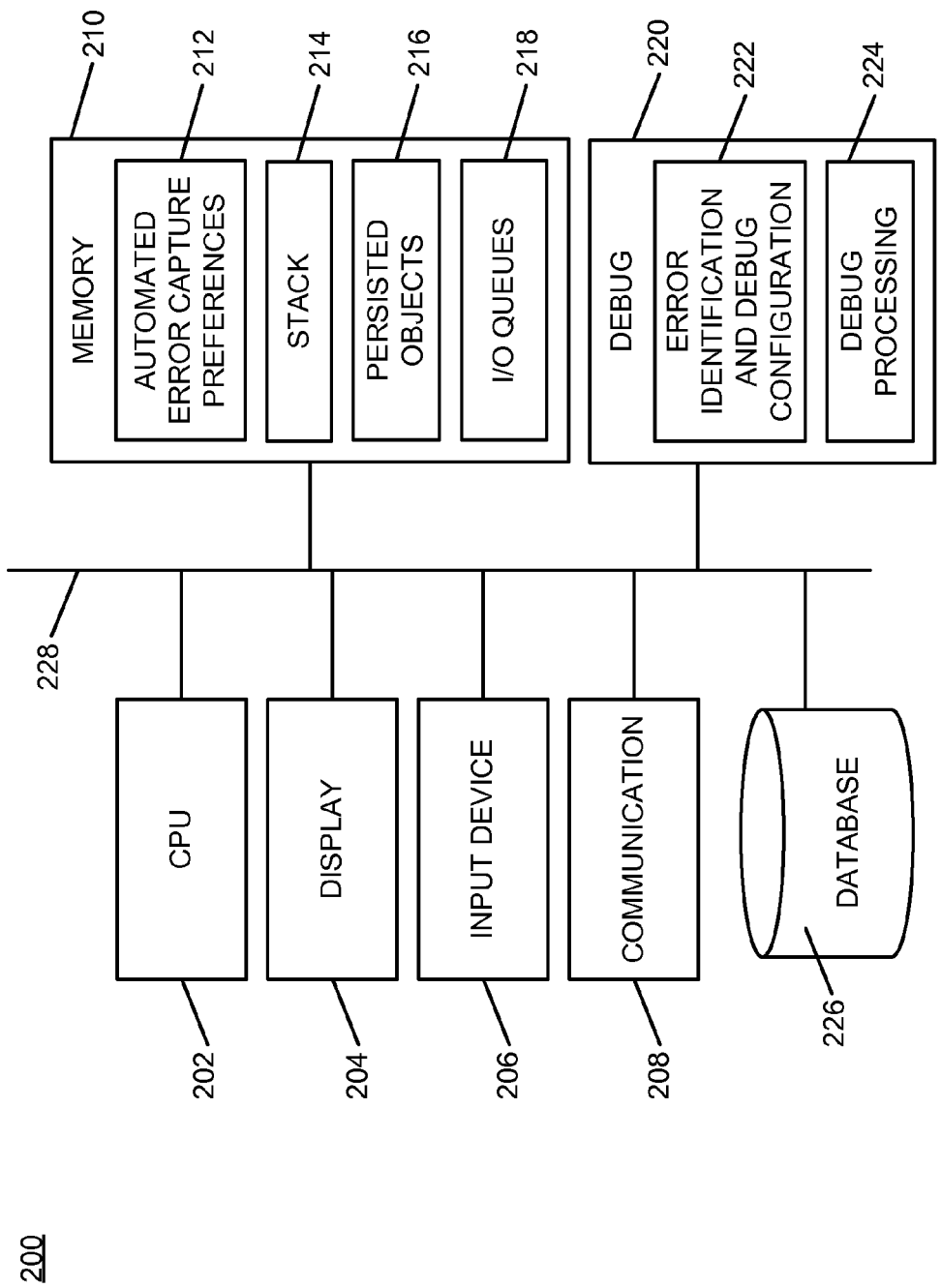
FIG. 2 is a block diagram of an example of an implementation of a core processing module capable of performing automated program subset execution and debug according to an embodiment of the present subject matter.

FIG. 2 is a block diagram of an example of an implementation of a core processing module 200 capable of performing automated program subset execution and debug. The core processing module 200 may be associated with both the development system 102 and the deployed system 108. Further, the core processing module 200 may provide complementary processing in association with each implementation, as described in more detail below. A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

A communication module 208 provides interconnection capabilities that allow the core processing module 200 to communicate with other modules within the system 100, such as the development system 102 and the deployed system 108, to provide automated program subset execution and debug. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes an automated error capture preferences storage area 212 that stores error capture and debugging preferences. The error capture and debugging preferences may include one or more application profiles that map code subsets to executable application code segments. Additionally the error capture and debug preferences may include debugging profiles and user preferences for debugging. As described above, a variety of debugging options are available, including preferences for how to identify a code subset of interest for debugging such as via use of an application profile or thread stack analysis. Additionally, a system may be restarted immediately after an error is detected and a debug entry point is automatically identified, or restart of the system may be delayed based upon user or customer preferences and debug configuration options. Many additional alternatives for error capture and debugging preferences are possible and all are considered within the scope of the present subject matter.

The memory 210 also includes a stack storage area 214. The stack storage area 214 may store one or more thread stacks that support operation of applications. As described above, a thread stack may be analyzed to identify code subsections of interest associated with detected errors and to identify a debug entry point automatically in response to identification of an error with an application.

A persisted objects storage area 216 may store active objects associated with an executing application at and in response to detection of execution of an application at a designated debug point of entry. Initial file states for any files, such as database files or other files, associated with an executing application may also be stored within the persisted objects storage area 216. Initial settings (e.g., register settings, etc.) for other types of inputs and outputs for external modules may also be stored within the persisted objects storage area 216. As such, all active objects associated with an application may be stored at the automatically identified debug point of entry.

An input/output (I/O) queues storage area 218 provides storage for one or more I/O queues utilized for capturing file input and output activity during execution of a program or application to be debugged. As described above, in response to automated identification of a debug point of entry and restart of an application, initial file states may be captured for any files, such a database files, or other files, and other I/O operations up to the debug point of entry may be captured into one or more I/O queues. During debugging, the initial file states may be recreated and all I/O operations may be executed against those files to place those files rapidly into a state equivalent to a state of the respective files in the deployed system at the debug point of entry. Accordingly, debugging speed may be improved by rapidly placing all files and other external I/O devices into an equivalent state to their respective states within a deployed system, but within a debug and development environment.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An error identification and debug configuration module 222 is also illustrated. The error identification and debug configuration module 222 provides a configurable error identification/detection and debugging configuration platform within the core processing module 200. The error identification and debug configuration module 222 may utilize profiles, such as application and debugging profiles, to track and monitor application execution. Automated error identification may be performed via analysis of I/O activities, detection of applications writing outside of allocated address spaces identified within an application profile, or any other detection mechanism as appropriate for a given implementation and configured error monitoring criteria. The error identification and debug configuration module 222 also may respond to administrator or user inputs for identification of errors as appropriate for a given implementation.

A debug module 220 provides the debug configuration and debug operations for the core processing module 200, as described above and in more detail below. The debug module 220 implements the automated program subset execution and debug of the core processing module 200.

The debug module 220 includes an error identification and debug configuration module 222. The error identification and debug configuration module 222 performs pre-debug processing, such as error detection, debug entry point identification, and debug metadata capture. The error identification and debug configuration module 222 may analyze an application execution point associated with a detected or otherwise identified error and may automatically identify and set a debug entry point at a location of execution of one or more applications or application threads prior to the detected or otherwise identified error. As described above, automated identification of a debug entry point may be performed in association with use of an application profile that identifies procedure or method entry points or by analysis of one or more thread stacks as appropriate for a given implementation. As also described above, the debug entry point may be in a code subset different from a code subset associated with an identified error.

The error identification and debug configuration module 222 may also automatically restart a system to begin capturing debug information and may set a debug marker at the identified debug entry point, and the debug marker or a separate debug flag may be used to trigger debug metadata capture during a subsequent execution of the deployed system. As described above, restart of a deployed application may be delayed based upon configured error capture preferences, and the configured error capture preferences may be configured, for example, within an application or debug profile.

It should be noted that the error identification and debug configuration module 222 may operate within a deployed system, such as the deployed system 108, and may also operate within a development system, such as the development system 102. However, for purposes of the examples below, it is understood that the error identification and debug configuration module 222 may operate within the deployed system 108 to expedite automated configuration and capture of debugging information.

A debug processing module 224 is also shown within the debug module 220 and responds to a determination that a debug marker has been set or that debugging has otherwise been enabled (e.g., via a debug flag) in response to a restart of an application. The debug processing module 224 captures initial file state information of one or more files associated with an application, or other input and/or output modules, and monitors application execution from the point of restart to the debug point of entry. During application execution, the debug processing module 224 queues each I/O operation onto an I/O queue that may either be a common I/O queue or an I/O queue associated with each particular application thread, as appropriate for a given implementation. The I/O queue(s) may be stored within the I/O queues storage area 218 described above. In response to detection of application execution at (e.g., up to) the debug entry point, the debug processing module 224 persists all active application objects or a subset of application objects into the persisted objects storage area 216, and stores all queued I/Os to an application thread to be executed in response to start of a debugging session. The determination to persist all application objects or a subset of application objects may be configured, for example, within an application or debug profile.

It should be noted that a user may be prompted to confirm storage of the debugging information as debug entry point metadata for a future debugging session or the debug entry point metadata may be persisted automatically as appropriate for a given implementation. Where storage space or other issues may warrant limiting debug entry point metadata information capture size, prompting a user with debug entry point metadata capture and persistence options may allow for persistence of I/Os and application objects of interest without storing I/Os and application objects that are not of interest for their given identified error. Additionally, these configuration options may form a portion of an application or debug profile that allows for automated debug processing of program subsets and capture of debug entry point metadata based upon different error types. As such, many options exist for capturing initial file states at a restart point for an application, capturing queued I/Os identified throughout the execution up to the debug point of entry, and capturing application objects at the debug point of entry, and all are considered within the scope of the present subject matter.

The error identification and debug configuration module 222 and the debug processing module 224 are shown collectively within the debug module 220 to show that these modules may be combined into a single module as appropriate for a given implementation and for ease of description below. However, it is understood that the debug module 220 may incorporate the functionality of both the error identification and debug configuration module 222 and the debug processing module 224 as appropriate for the given implementation within either a development system, such as the development system 102, or a deployed system, such as the deployed system 108. Alternatively, the error identification and debug configuration module 222 may be implemented within a deployed system, such as the deployed system 108, while the debug processing module 224 may be implemented within a development system, such as the development system 102, as appropriate for a given implementation. References below to the debug module 220 are used for brevity, but are understood to incorporate either or both of the error identification and debug configuration module 222 and the debug processing module 224 as appropriate for the particular example and/or a given implementation.

Though the debug module 220 is illustrated as a component-level module for ease of illustration and description purposes, it should be noted that the debug module 220 may include any hardware, programmed processor(s), and memory used to carry out the functions of this module as described above and in more detail below. For example, the debug module 220 may include additional controller circuitry in the form of application specific integrated circuits (ASICs), processors, and/or discrete integrated circuits and components for performing communication and electrical control activities associated with the respective devices. Additionally, the debug module 220 may also include interrupt-level, stack-level, and application-level modules as appropriate. Furthermore, the debug module 220 may include any memory components used for storage, execution, and data processing for performing processing activities associated with the module.

It should also be noted that the debug module 220 may form a portion of other circuitry described without departure from the scope of the present subject matter. Further, the debug module 220 may alternatively be implemented as an application stored within the memory 210. In such an implementation, the debug module 220 may include instructions executed by the CPU 202 for performing the functionality described herein. The CPU 202 may execute these instructions to provide the processing capabilities described above and in more detail below for the core processing module 200. The debug module 220 may form a portion of an interrupt service routine (ISR), a portion of an operating system, a portion of a browser application, or a portion of a separate application without departure from the scope of the present subject matter.

A database 226 is associated with the core processing module 200 and provides storage capabilities for information associated with the automated program subset execution and debug of the core processing module 200. The database 226 generally represents the development database 104 and/or the deployed database 110 in view of the respective examples and shows that the respective databases may be associated with the core processing module 200 rather than a separate device. As such, the respective databases may be operatively coupled to the core processing module 200 as appropriate for a given implementation.

The CPU 202, the display 204, the input device 206, the communication module 208, the memory 210, the debug module 220, and the database 226 are interconnected via an interconnection 228. The interconnection 228 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database 226 generally represents the respective databases of FIG. 1, the information stored within the respective databases may also be stored within the memory 210 without departure from the scope of the present subject matter. Accordingly, the core processing module 200 may take many forms and may be associated with many platforms.

FIG. 3 through FIG. 6 below describe example processes that may be executed by devices, such as the core processing module 200, to perform the automated program subset execution and debug associated with the present subject matter. Many other variations on the example processes are possible and all are considered within the scope of the present subject matter. The example processes may be performed by modules, such as the debug module 220 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter.

Figure 3:
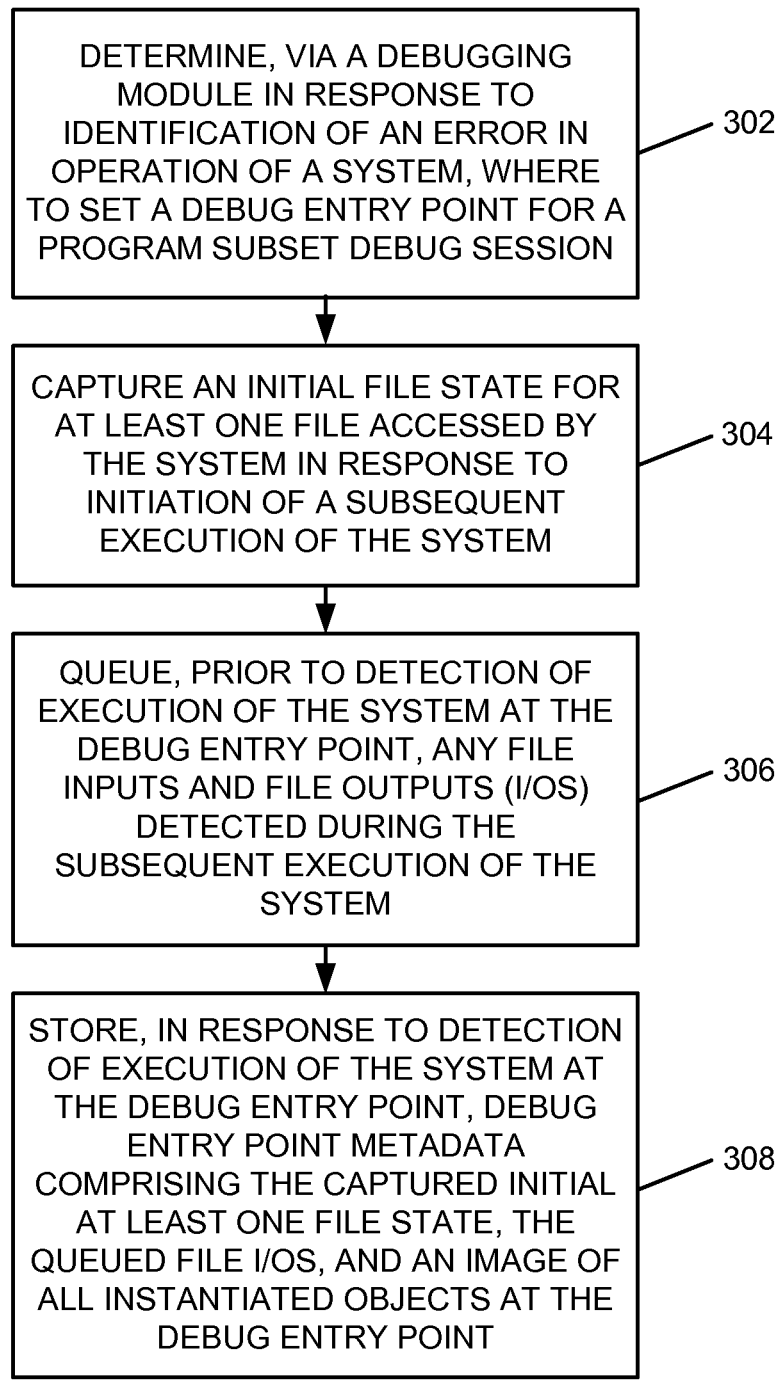
FIG. 3 is a flow chart of an example of an implementation of a process for automated program subset execution and debug according to an embodiment of the present subject matter.

FIG. 3 is a flow chart of an example of an implementation of a process 300 for automated program subset execution and debug. At block 302, the process 300 determines, via a debugging module in response to identification of an error in operation of a system, where to set a debug entry point for a program subset debug session. At block 304, the process 300 captures an initial file state for at least one file accessed by the system in response to initiation of a subsequent execution of the system. At block 306, the process 300 queues, prior to detection of execution of the system at the debug entry point, any file inputs and file outputs (I/Os) detected during the subsequent execution of the system. At block 308, the process 300 stores, in response to detection of execution of the system at the debug entry point, debug entry point metadata comprising the captured initial at least one file state, the queued file I/Os, and an image of all instantiated objects at the debug entry point.

Figure 4:
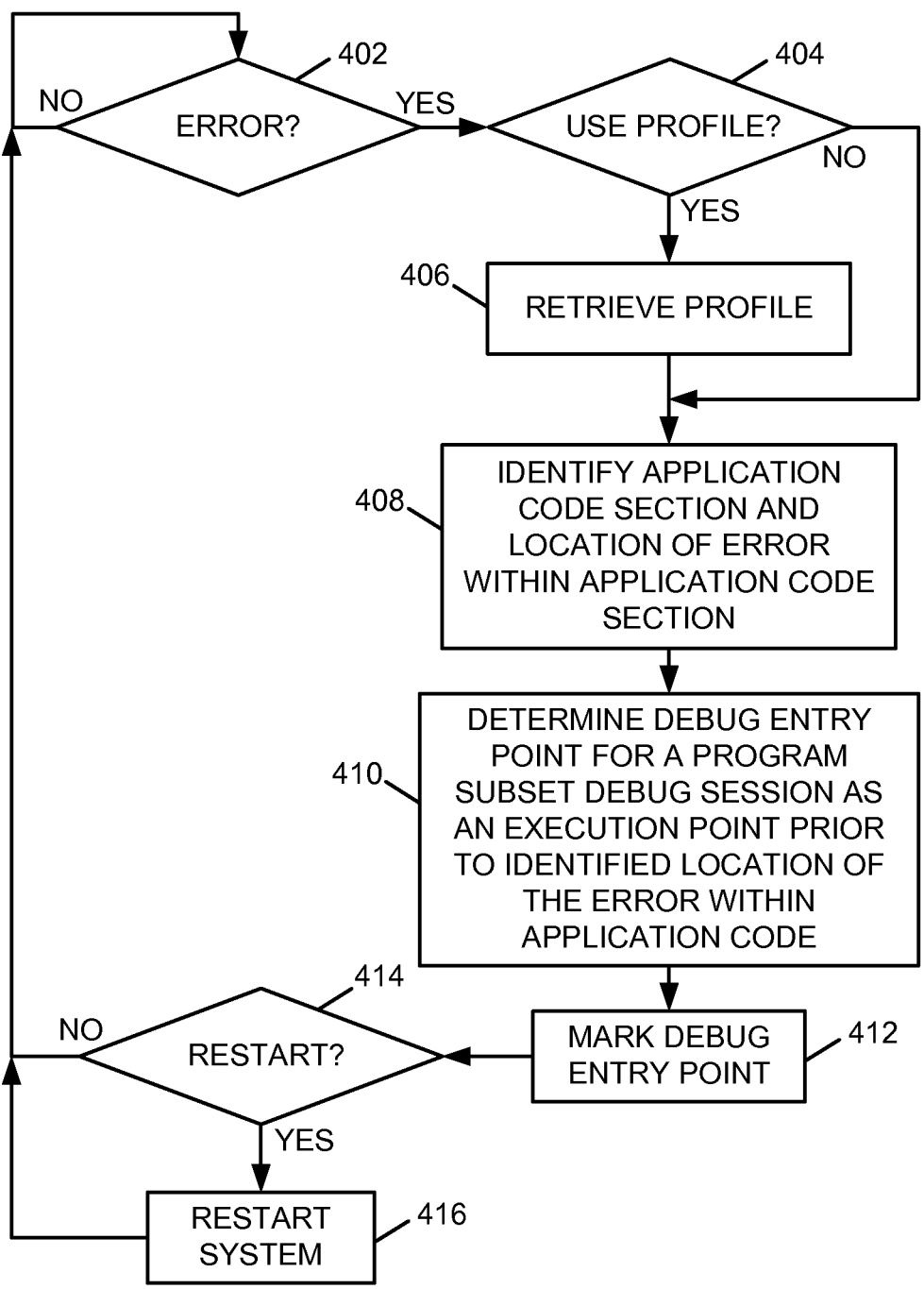
FIG. 4 is a flow chart of an example of an implementation of a process for automated program subset execution and debug for configuring debug metadata capture according to an embodiment of the present subject matter.

FIG. 4 is a flow chart of an example of an implementation of a process 400 for automated program subset execution and debug at a system, such as the deployed system 108, for configuring debug metadata capture. At decision point 402, the process 400 makes a determination as to whether an error has been detected or identified. As described above, an error may be automatically detected by a debug module, such as the debug module 220, by monitoring execution of one or more application threads and/or by use of other execution metrics such as address space accesses or other factors as appropriate for a given implementation. Alternatively, an error may be identified by an administrator or system operator and error identification may be detected by the process 400 in response to input by the administrator or system operator of the identified error. For automated detection of errors, the process 400 may, for example, monitor operations of the system during operation of the system and compare the monitored system operations with the expected system operations. The process 400 may detect a difference between the monitored system operations and the expected system operations to identify an error in operation of the system. Other forms of error detection are possible and all are considered within the scope of the present subject matter.

In response to determining that an error has been detected or identified at decision point 402, the process 400 makes a determination at decision point 404 as to whether to use a profile, such as an application profile or a debug profile, to assist with determination of a debug entry point. As described above, an application or debug profile may be used to identify method or procedure entry locations within compiled or interpreted code, and other locations that may be used as debug entry points. Alternatively, analysis of one or more stacks, such as a system stack and/or thread stacks, may be performed to identify and determine debug entry points. As such, the determination at decision point 404 may be utilized to select between the respective alternatives.

In response to determining at decision point 404 to use a profile for determination of a debug entry point, the process 400 retrieves the respective profile at block 406. In response to retrieving the profile at block 406 or in response to determining not to use a profile at decision point 404, the process 400 identifies an application code section and a location of the detected error within the application code section at block 408. For example, the process 400 may identify the application code section and the location of the error using the retrieved profile or may identify an application thread and a location within that thread using stack analysis.

At block 410, the process 400 determines a debug entry point for a program subset debug session as an execution entry point prior to the identified location of the error within the application code. As described above, the debug entry point may include a method or procedure entry point or any other executable and identifiable code location within an executable code set. The debug entry point represents a beginning of a program subset for execution and debug. It should also be noted that the determined debug entry point may be associated with a different code section from the code section within which the error was detected. As such, the process 400 may utilize an application profile to identify other code sections of interest for selection by the process 400 as a debug entry point. Such code sections of interest may be prioritized or otherwise categorized within an application or debug profile and modified throughout a life of an operating system to continually improve system operation over time. It should be noted that the process 400 may additionally modify an application profile to identify selected debug entry points to facilitate increased performance for future debug entry point determinations.

At block 412, the process 400 marks the debug entry point. Marking of the debug entry point may include marking an identified code subsection of interest as a debug entry within an application profile or debug profile. Additionally or alternatively, marking of the debug entry point may include setting a flag, such as a debug flag, an execution address, or other indicator that triggers debug metadata capture processing by other processes described below.

At decision point 414, the process 400 makes a determination as to whether to restart operation of the system. As described above, detection of an error and determination of a debug entry point may be configured to restart operation of a system. Such a configuration may be identified within an application or debug profile, with register flags, or by any other method appropriate for a given implementation. Alternatively, certain systems may preferably be restarted at a later time or date, which may be configured in association with an application or debug profile. In response to determining to restart operation of the system at decision point 414, the process 400 restarts the system at block 416. Restarting of the system may include a general reboot or reset of the system or may include restarting a subset of a system associated with an identified code section of interest for debug as appropriate for a given implementation. In response to restarting the system at block 416, or in response to determining not to restart the system at decision point 414, the process 400 returns to decision point 402 and iterates as described above.

As such, the process 400 configures debug metadata capture in response to detection of errors in operation of a system. A profile may be used or stack analysis may be used to identify application code sections and locations of errors that have been detected. Debug entry points may be automatically determined at a convenient and identifiable code execution point and that code execution point may be marked as a debug entry point for automated program subset execution and debug.

Figure 5:
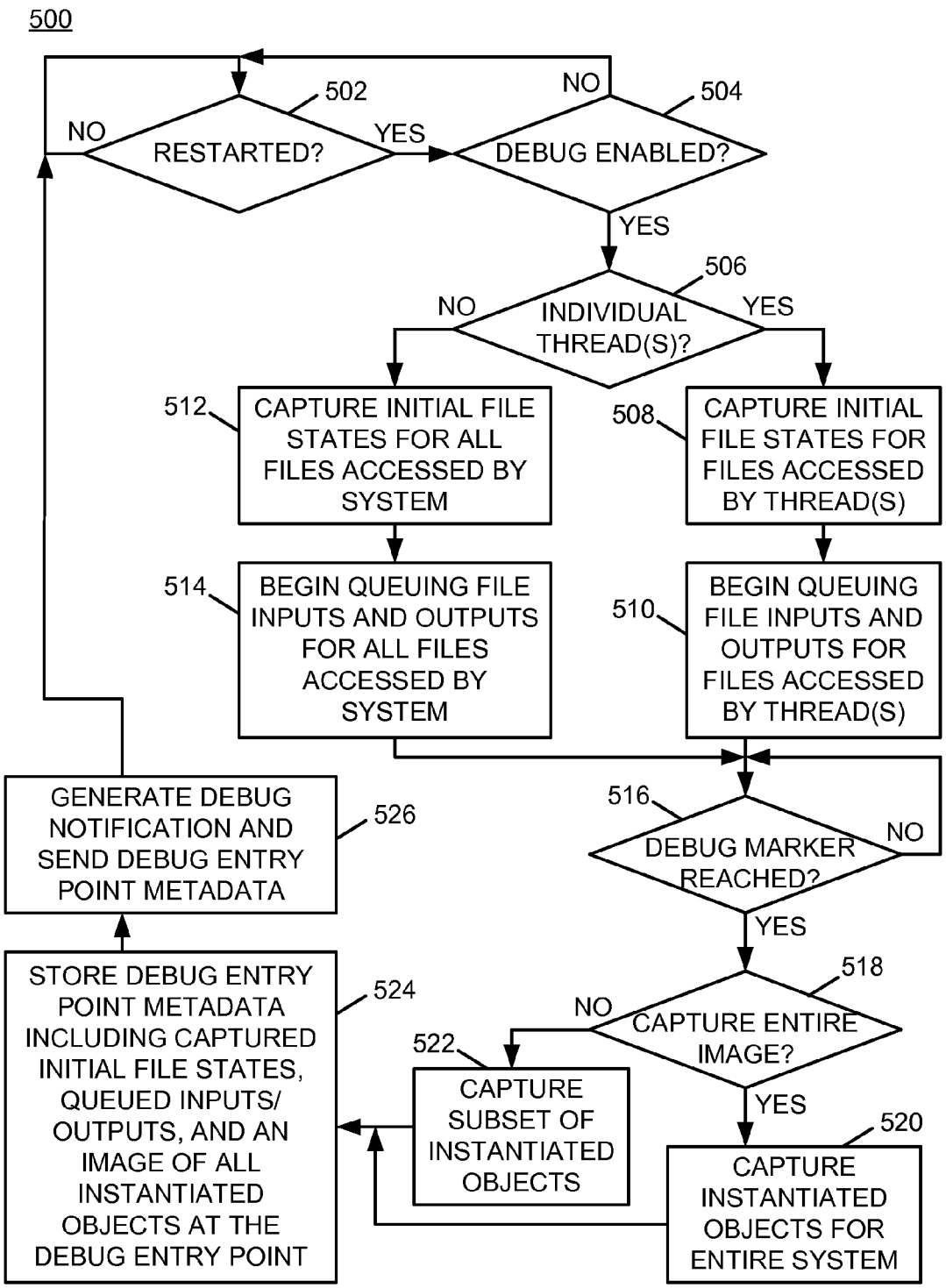
FIG. 5 is a flow chart of an example of an implementation of a process for automated program subset execution and debug at a system for debug entry point metadata capture based upon an identified debug entry point according to an embodiment of the present subject matter.

FIG. 5 is a flow chart of an example of an implementation of a process 500 for automated program subset execution and debug at system, such as the deployed system 108, for debug entry point metadata capture based upon an identified debug entry point. As such, the process 500 may operate in conjunction with or as a part of a process, such as the process 400 of FIG. 4, in response to restarts of a system to determine whether a debug entry point has been set and whether debugging for automated program subset execution has been enabled. At decision point 502, the process 500 makes a determination as to whether a system or subsystem has been restarted. In response to determining that a system or subsystem restart has occurred, the process 500 makes a determination at decision point 504 as to whether debugging is enabled. As described above, a debug flag or other identifier may be set either within a register space or within an application or debug profile to signify that debugging is enabled. Additionally or alternatively, setting of a debug entry point by a process, such as the process 400 of FIG. 4, may be detected by the process 500. In response to determining that debugging is not enabled, the process 500 returns to decision point 502 to await another restart.

In response to determining at decision point 504 that debugging is enabled, the process 500 makes a determination at decision point 506 as to whether debugging is enabled for individual threads, or whether debugging has been enabled for an entire system. In response to determining that debugging has been enabled for one or more threads or subsystems (e.g., less than the entire system), the process 500 captures initial file states for files accessed by the thread(s) or subsystem(s) at block 508. As described above, capturing the initial file states allows subsequent debugging of program subsets by allowing I/Os for the files to be replayed and executed against the files prior to the debug entry point without having to execute the code that performs the individual I/Os. It should additionally be noted that capturing the initial file states for the files accessed by the threads may include comparing a file state of an existing file at the initiation of the restart (e.g., subsequent execution) of the system with a configured default initial file state for the respective files. A determination may be made that the file state of the existing files at the initiation of the subsequent execution is corrupted based upon a comparison of the file state of the existing file with the configured default initial file state for the respective files. As such, processing at block 508 may include capturing configured default initial file states where one or more files are corrupted rather than capturing the actual files that have been determined to be corrupted. Further, the capturing may include capturing an initial file state for a subset of all files in the system that are accessed by the application thread. At block 510, the process 500 begins queuing file inputs and outputs for files accessed by the respective thread(s) or subsystem(s). The queuing of the file I/Os may include queuing file I/Os for the identified subset of all files in the system that are accessed by the application thread. For purposes of the present subject matter, queuing of file I/Os continues until the execution of the system up to/at the debug entry point is detected.

Returning to decision point 506, in response to determining that debugging has been enabled for the entire system rather than just for individual threads or subsystems, the process 500 captures initial file states for files accessed by the entire system at block 512. As with block 508 above, file states during this subsequent execution may be compared with configured default initial file states and the configured initial file states may be selected and captured as initial file states for any corrupted files. At block 514, the process 500 begins queuing file inputs and outputs for all files accessed by the system. As described above, queuing of file I/Os continues until the execution of the system up to/at the debug entry point is detected.

In response to beginning queuing of file inputs and outputs for either individual threads or subsystems at block 510, or for the entire system at block 514, the process 500 makes a determination at decision point 516 as to whether the debug marker (e.g., the debug entry point) has been reached. In response to determining that the debug entry point has not been reached, the process 500 iterates and continues queuing file inputs and outputs until the debug entry point has been reached during execution of the system.

In response to determining at decision point 516 that the debug entry point has been reached during execution of the system, the process 500 makes a determination at decision point 518 as to whether to capture an entire system image or whether to capture a subset of instantiated objects, which may be based upon the configured debug processing and the respective error that has been detected by a process such as the process 400 of FIG. 4. In response to determining to capture an entire system image, the process 500 captures instantiated objects for the entire system at block 520. In response to determining at decision point 518 to capture a subset of instantiated objects, the process 500 captures the designated subset of instantiated objects at block 522.

In response to capturing the respective instantiated objects based upon the debug configuration at block 520 or block 522, the process 500 stores debug entry point metadata, including the captured initial file states, the queued inputs/outputs, and an image of all instantiated objects captured at the debug entry point at block 524. It should initially be noted that the queued file inputs and outputs may be stored as an executable thread to be executed upon initiation of a debug session within the debug entry point metadata. At block 526, the process 500 generates a debug notification and sends the debug entry point metadata to a configured development system, such as the development system 102. Configuration of a development system and sending of debug entry point metadata may be performed using an application or debug profile and may be configured based upon security or other concerns, as appropriate for a given implementation. As such, the process 500 may generate a debug notification without sending the debug entry point metadata without departure from the scope of the present subject matter. The process 500 returns to decision point 502 and iterates as described above.

As such, the process 500 detects a system restart and determines whether debugging is enabled. Individual threads, subsystems, or an entire system may be debugged and initial file states may be captured for the respective scope of debugging. File inputs and outputs are queued until the debug entry point is reached. In response to reaching the debug entry point, initial file states and the queued file I/O are stored along with an image of all instantiated objects within the configured debug scope. As described above and in more detail below, the debug entry point metadata may be used to perform automated program subset execution and debug without requiring all executable code prior to the debug point of entry to be executed. Accordingly, debugging may be performed more rapidly for both small and large/complex systems based upon the subject matter described herein.

Figure 6:
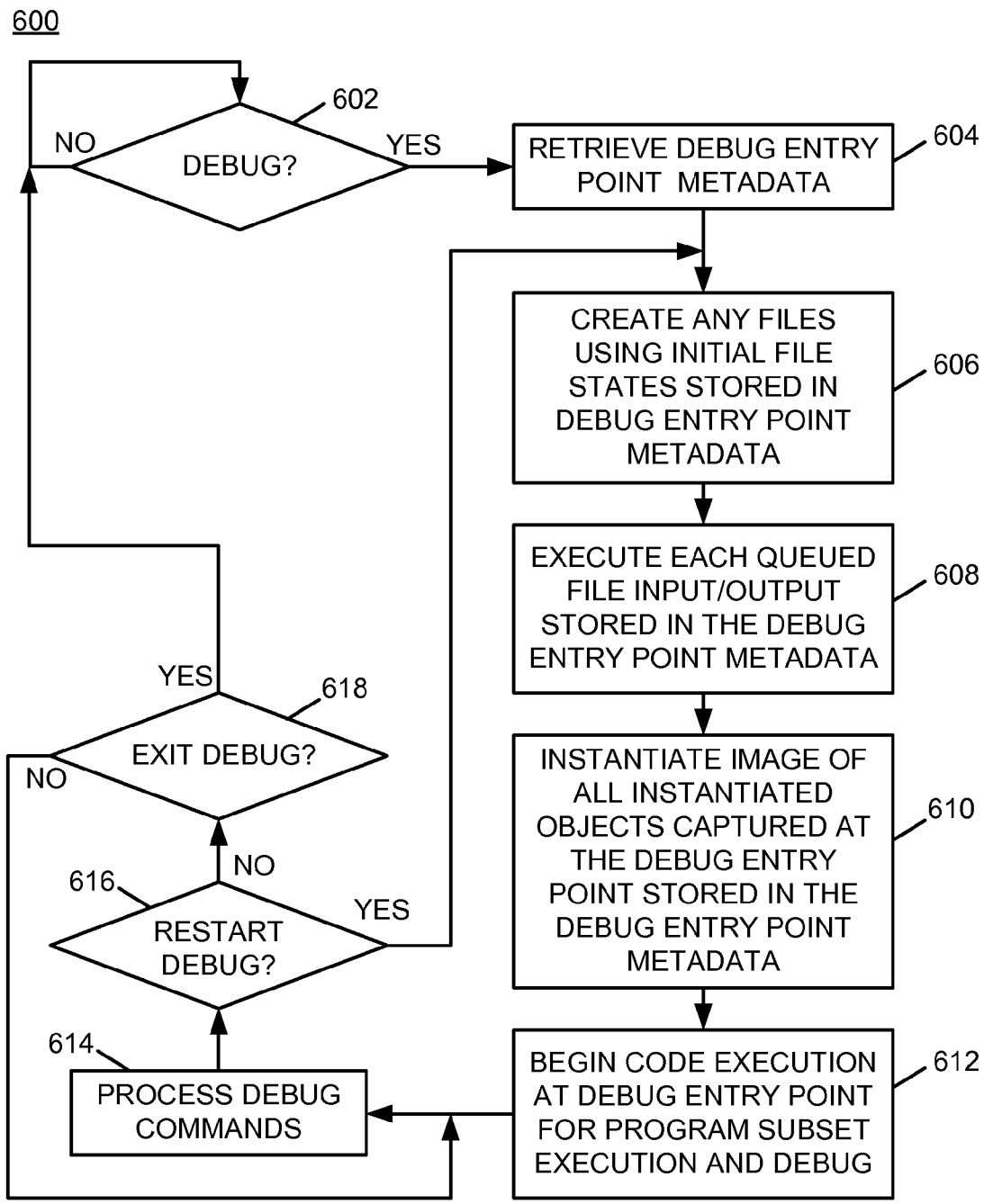
FIG. 6 is a flow chart of an example of an implementation of a process for automated program subset execution and debug at a system based upon entry point debug metadata according to an embodiment of the present subject matter.

FIG. 6 is a flow chart of an example of an implementation of a process 600 for automated program subset execution and debug at a system, such as the development system 102, based upon entry point debug metadata. However, it should be understood that the automated program subset execution and debug described herein may be performed on the same system from which the debug entry point metadata was captured without departure from the scope of the claimed subject matter. At decision point 602, the process 600 makes a determination as to whether to begin a program subset debugging session. The determination at decision point 602 may be performed in response to receiving a debug notification, such as that generated by the process 500 of FIG. 5. Alternatively, debugging may be initiated by a developer via generation of a debug request and that debug request may be detected by the process 600. In response to determining that initiation of a program subset debug session has been detected, the process 600 retrieves debug entry point metadata at block 604. As described above, the debug entry point metadata includes captured initial file states, queued file inputs and outputs, and captured images of instantiated objects. The debug entry point metadata may include an executable thread comprising all file I/Os that were queued during debug entry point metadata capture prior to detection of execution of the system up to/at the debug entry point.

At block 606, the process 600 creates any files accessed by the system using the initial file states stored in the debug entry point metadata for each of the respective files. At block 608, the process 600 executes each queued file input and output stored in the debug entry point metadata. As described above, this may include execution of a separate thread that includes all queued and stored file I/Os. At block 610, the process 600 instantiates an image of all instantiated objects captured at the debug entry point that are stored within the debug entry point metadata. At block 612, the process 600 begins code execution at the debug entry point for program subset execution and debug. It should be noted that code prior to the debug entry point is not executed.

At block 614, the process 600 processes debug commands. The debug commands processed at block 614 may include any debug commands appropriate for a given implementation including setting of break points, changing register or data object values, or any other debug commands appropriate for a given implementation.

At decision point 616, the process 600 makes a determination as to whether to restart a new program subset debugging session. In response to determining to restart a new program subset debugging session, the process 600 returns to decision point 606 and iterates as described above. As such, multiple program subset debugging sessions may be iteratively processed without execution of application code prior to the debug point of entry.

In response to determining at decision point 616 not to restart a new program subset debugging session, the process 600 makes a determination at decision point 618 as to whether to exit the current program subset debugging session. In response to determining not to exit the current program subset debugging session, the process 600 returns to decision point 614 to process additional debugging commands and iterates as described above. In response to determining at decision point 618 to exit the current program subset debugging session, the process 600 returns to decision point 602 and iterates as described above.

As such, the process 600 retrieves debug entry point metadata and creates files using initial file states stored in the debug entry point metadata. The process 600 also executes any file I/Os against the files and instantiates an image of all instantiated objects within the scope of the configured program subset debugging session and begins code execution at the debug point of entry without execution of application code prior to the debug entry point. Multiple program subset debugging sessions may be rapidly invoked, again without execution of application code prior to the debug entry point.

As described above in association with FIG. 1 through FIG. 6, the example systems and processes provide program subset execution and debug. Many other variations and additional activities associated with program subset execution and debug are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   a memory; and
   a processor programmed to:
   identify an error in operation of a system;
   determine, by analysis of code build information of the system with the identified error, where to set a debug entry point at which to start execution of the system during a program subset debug session;
   capture an initial file state for at least one file accessed by the system in response to initiation of a subsequent execution of the system;
   queue, prior to detection of execution of the system at the debug entry point, any file inputs and file outputs (I/Os) detected as being performed by the system during the subsequent execution of the system; and
   store in the memory, in response to detection of execution of the system at the debug entry point, debug entry point metadata comprising the captured initial at least one file state, the queued file I/Os detected as being performed by the system, and an image of all instantiated objects of the system at the debug entry point.

2. The system of claim 1, where, in being programmed to determine, by the analysis of code build information of the system with the identified error, where to set the debug entry point at which to start the execution of the system during the program subset debug session, the processor is programmed to:
   retrieve an application configuration profile for the system, where the application configuration profile stores the code build information;
   identify an application code section and a location within the application code section of the identified error using the application configuration profile;
   determine the debug entry point at which to start the execution of the system during the program subset debug session as an execution entry point within application code of the system prior to the identified location within the application code section of the identified error; and
   mark the debug entry point at which to start the execution of the system during the program subset debug session.

3. The system of claim 1, where the processor is further programmed to:
   identify an application thread associated with an application code section within which the identified error is located; and
   where, in being programmed to:
   capture the initial file state for the at least one file accessed by the system in response to the initiation of the subsequent execution of the system, the processor is programmed to capture the initial file state for a subset of all files in the system that are accessed by the application thread; and
   queue, prior to detection of execution of the system at the debug entry point, any file I/Os detected as being performed by the system during the subsequent execution of the system, the processor is programmed to queue the file I/Os for the subset of all files in the system that are accessed by the application thread.

4. The system of claim 1, where, in being programmed to determine, by the analysis of code build information of the system with the identified error, where to set the debug entry point at which to start the execution of the system during the program subset debug session, the processor is programmed to:
   analyze one of a thread stack and a system stack;
   identify an application code section and a location within the application code section of the identified error using the analysis of the one of the thread stack and the system stack;
   determine the debug entry point at which to start the execution of the system during the program subset debug session as an execution entry point within application code of the system prior to the identified location within the application code section of the identified error; and mark the debug entry point at which to start the execution of the system during the program subset debug session.

5. The system of claim 1, where, in being programmed to identify the error in the operation of the system, the processor is programmed to:

monitor system operations of the system during the operation of the system;

compare the monitored system operations of the system with expected system operations of the system;

detect a difference between the monitored system operations and the expected system operations; and identify the error in the operation of the system as the detected difference between the monitored system operations and the expected system operations.

6. The system of claim 1, where, in being programmed to:

capture the initial file state for the at least one file accessed by the system in response to the initiation of the subsequent execution of the system, the processor is programmed to:

compare the initial file state of the at least one file accessed by the system with a configured default initial file state for the at least one file; and determine that the initial file state of the at least one file at the initiation of the subsequent execution of the system is corrupted based upon the comparison of the initial file state of the at least one file with the configured default initial file state for the at least one file; and store in the memory, in response to the detection of the execution of the system at the debug entry point, the debug entry point metadata comprising the captured initial file state, the processor is programmed to store in the memory the configured default initial file state of the at least one file.

7. The system of claim 1, where the processor is further programmed to:

detect a request to initiate the program subset debug session;

create the at least one file accessed by the system using the captured initial file state stored in the debug entry point metadata for the at least one file;

execute each queued file I/O detected as being performed by the system stored in the debug entry point metadata;

instantiate the image of all instantiated objects of the system at the debug entry point stored in the debug entry point metadata; and initiate a debug execution of the system at the debug entry point.

8. The system of claim 1, where, in being programmed to:

store in the memory, in response to the detection of the execution of the system at the debug entry point, the queued file I/Os detected as being performed by the system within the debug entry point metadata, the processor is programmed to store in the memory the queued file I/Os detected as being performed by the system as an execution thread within the debug entry point metadata; and where the processor is further programmed to execute each queued file I/O detected as being performed by the system stored within the debug entry point metadata within the program subset debug session under control of the execution thread.

9. A computer program product comprising a computer readable storage medium including computer readable program code, where the computer readable storage medium is not a transitory signal per se and where the computer readable program code when executed on a computer causes the computer to:

identify an error in operation of a system;

determine, by analysis of code build information of the system with the identified error, where to set a debug entry point at which to start execution of the system during a program subset debug session;

capture an initial file state for at least one file accessed by the system in response to initiation of a subsequent execution of the system;

queue, prior to detection of execution of the system at the debug entry point, any file inputs and file outputs (I/Os) detected as being performed by the system during the subsequent execution of the system; and store, in response to detection of execution of the system at the debug entry point, debug entry point metadata comprising the captured initial at least one file state, the queued file I/Os detected as being performed by the system, and an image of all instantiated objects of the system at the debug entry point.

10. The computer program product of claim 9, where in causing the computer to determine, by the analysis of code build information of the system with the identified error, where to set the debug entry point at which to start the execution of the system during the program subset debug session, the computer readable program code when executed on the computer causes the computer to:

retrieve an application configuration profile for the system, where the application configuration profile stores the code build information;

identify an application code section and a location within the application code section of the identified error using the application configuration profile;

determine the debug entry point at which to start the execution of the system during the program subset debug session as an execution entry point within application code of the system prior to the identified location within the application code section of the identified error; and mark the debug entry point at which to start the execution of the system during the program subset debug session.

11. The computer program product of claim 9, where the computer readable program code when executed on the computer further causes the computer to:

identify an application thread associated with an application code section within which the identified error is located; and where in causing the computer to:

capture the initial file state for the at least one file accessed by the system in response to the initiation of the subsequent execution of the system, the computer readable program code when executed on the computer causes the computer to capture the initial file state for a subset of all files in the system that are accessed by the application thread; and queue, prior to detection of execution of the system at the debug entry point, any file I/Os detected as being performed by the system during the subsequent execution of the system, the computer readable program code when executed on the computer causes the computer to queue the file I/Os for the subset of all files in the system that are accessed by the application thread.

12. The computer program product of claim 9, where in causing the computer to determine, by the analysis of code build information of the system with the identified error, where to set the debug entry point at which to start the execution of the system during the program subset debug session, the computer readable program code when executed on the computer causes the computer to:
   analyze one of a thread stack and a system stack;
   identify an application code section and a location within the application code section of the identified error using the analysis of the one of the thread stack and the system stack;
   determine the debug entry point at which to start the execution of the system during the program subset debug session as an execution entry point within application code of the system prior to the identified location within the application code section of the identified error; and
   mark the debug entry point at which to start the execution of the system during the program subset debug session.

13. The computer program product of claim 9, where, in causing the computer to identify the error in the operation of the system, the computer readable program code when executed on the computer causes the computer to:
   monitor system operations of the system during the operation of the system;
   compare the monitored system operations of the system with expected system operations of the system;
   detect a difference between the monitored system operations and the expected system operations; and
   identify the error in the operation of the system as the detected difference between the monitored system operations and the expected system operations.

14. The computer program product of claim 9, where in causing the computer to:
   capture the initial file state for the at least one file accessed by the system in response to the initiation of the subsequent execution of the system, the computer readable program code when executed on the computer causes the computer to:
      compare the initial file state of the at least one file accessed by the system with a configured default initial file state for the at least one file; and
      determine that the initial file state of the at least one file at the initiation of the subsequent execution of the system is corrupted based upon the comparison of the initial file state of the at least one file with the configured default initial file state for the at least one file; and
   store, in response to the detection of the execution of the system at the debug entry point, the debug entry point metadata comprising the captured initial file state, the computer readable program code when executed on the computer causes the computer to store the configured default initial file state of the at least one file.

15. The computer program product of claim 9, where the computer readable program code when executed on the computer further causes the computer to:
   detect a request to initiate the program subset debug session;
   create the at least one file accessed by the system using the captured initial file state stored in the debug entry point metadata for the at least one file;
   execute each queued file I/O detected as being performed by the system stored in the debug entry point metadata;
   instantiate the image of all instantiated objects of the system at the debug entry point stored in the debug entry point metadata; and
   initiate a debug execution of the system at the debug entry point.

16. The computer program product of claim 9, where in causing the computer to:
   store, in response to the detection of the execution of the system at the debug entry point, the queued file I/Os detected as being performed by the system within the debug entry point metadata, the computer readable program code when executed on the computer causes the computer to store the queued file I/Os detected as being performed by the system as an execution thread within the debug entry point metadata; and
   where the computer readable program code when executed on the computer further causes the computer to execute each queued file I/O detected as being performed by the system stored within the debug entry point metadata within the program subset debug session under control of the execution thread.

\* \* \* \* \*